(12) United States Patent
Dolgin et al.

(10) Patent No.: US 9,131,155 B1
(45) Date of Patent: Sep. 8, 2015

(54) DIGITAL VIDEO STABILIZATION FOR MULTI-VIEW SYSTEMS

(75) Inventors: Yuri Dolgin, Haifa (IL); Eran Pinhasov, Zichron Yaakov (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 255 days.

(21) Appl. No.: 13/330,589

(22) Filed: Dec. 19, 2011

Related U.S. Application Data

(60) Provisional application No. 61/424,861, filed on Dec. 20, 2010.

(51) Int. Cl.
H04N 5/232 (2006.01)
H04N 13/02 (2006.01)

(52) U.S. Cl.
CPC ........ *H04N 5/23248* (2013.01); *H04N 13/0275* (2013.01)

(58) Field of Classification Search
CPC .......... H04N 5/23248; H04N 5/23254; H04N 5/23267; H04N 5/272; H04N 13/022; H04N 13/0271; H04N 13/0275
USPC ...................................... 348/208.6
See application file for complete search history.

(56) References Cited

U.S. PATENT DOCUMENTS

| | | |
|---|---|---|
| 6,404,196 B1 | 6/2002 | Duerk et al. |
| 6,487,304 B1 | 11/2002 | Szeliski |
| 7,714,892 B2 | 5/2010 | Clark, II et al. |
| 7,768,551 B2 | 8/2010 | Yang et al. |
| 2004/0001147 A1* | 1/2004 | Vella et al. ............... 348/208.99 |
| 2004/0109004 A1* | 6/2004 | Bastos et al. .................. 345/587 |
| 2004/0109585 A1* | 6/2004 | Tao et al. ...................... 382/106 |
| 2006/0088191 A1 | 4/2006 | Zhang et al. |
| 2007/0248166 A1* | 10/2007 | Chen et al. ............... 375/240.16 |
| 2008/0106608 A1* | 5/2008 | Clark et al. .............. 348/208.99 |
| 2008/0212687 A1 | 9/2008 | Liu |

(Continued)

OTHER PUBLICATIONS

Liu, Feng, et al. Content-Preserving Warps for 3D Video Stabilization. ACM Transactions on Graphics (TOG), Proceedings of ACM SIGGGRAPH 2009, vol. 28, issue 3, article 44, Aug. 2009, http://pages.cs.wisc.edu/~fliu/project/3dstab.htm.

(Continued)

*Primary Examiner* — Roberto Velez
*Assistant Examiner* — Abdelaaziz Tissire
(74) *Attorney, Agent, or Firm* — Knobbe, Martens, Olson & Bear, LLP

(57) ABSTRACT

A system, method, and computer program product for digital stabilization of video data from cameras producing multiple simultaneous views, typically from rolling shutter type sensors, and without requiring a motion sensor. A first embodiment performs an estimation of the global transformation on a single view and uses this transformation for correcting other views. A second embodiment selects a distance at which a maximal number of scene points is located and considers only the motion vectors from these image areas for the global transformation. The global transformation estimate is improved by averaging images from several views and reducing stabilization when image conditions may cause incorrect stabilization. Intentional motion is identified confidently in multiple views. Local object distortion may be corrected using depth information. A third embodiment analyzes the depth of the scene and uses the depth information to perform stabilization for each of multiple depth layers separately.

20 Claims, 3 Drawing Sheets

(56) References Cited

U.S. PATENT DOCUMENTS

| | | |
|---|---|---|
| 2008/0291285 A1 | 11/2008 | Shimizu |
| 2008/0309769 A1 | 12/2008 | Albu et al. |
| 2009/0066800 A1 | 3/2009 | Wei |
| 2009/0096878 A1 | 4/2009 | Chen et al. |
| 2009/0153710 A1 | 6/2009 | John |
| 2009/0160957 A1* | 6/2009 | Deng et al. ............... 348/208.99 |
| 2009/0201383 A1 | 8/2009 | Slavin |
| 2009/0219401 A1 | 9/2009 | Drouot |
| 2009/0232216 A1 | 9/2009 | Kurata |
| 2009/0237516 A1 | 9/2009 | Jayachandra et al. |
| 2010/0033617 A1* | 2/2010 | Forutanpour ................ 348/345 |
| 2010/0111417 A1 | 5/2010 | Ward et al. |
| 2010/0165152 A1* | 7/2010 | Lim ........................ 348/240.99 |
| 2010/0208087 A1* | 8/2010 | Ogawa ....................... 348/208.4 |
| 2011/0085049 A1 | 4/2011 | Dolgin et al. |
| 2011/0242339 A1* | 10/2011 | Ogawa ....................... 348/208.4 |
| 2012/0121163 A1* | 5/2012 | Zhang et al. ................... 382/154 |
| 2012/0127267 A1* | 5/2012 | Zhang et al. ..................... 348/43 |
| 2012/0307084 A1* | 12/2012 | Mantzel et al. ............. 348/208.2 |

OTHER PUBLICATIONS

Smith, Brandon M., et al. Light Field Video Stabilization. IEEE International Conference on Computer Vision (ICCV), Sep. 29-Oct. 2, 2009.

* cited by examiner

DIGITAL VIDEO STABILIZATION FOR MULTI-VIEW SYSTEMS

CROSS REFERENCE TO RELATED APPLICATIONS

This application is based upon and claims the benefit under 35 U.S.C. 119(e) of commonly-assigned U.S. provisional application Ser. No. 61/424,861, filed Dec. 20, 2010, and entitled "Digital Video Stabilization for Multi-View Systems", which is hereby incorporated by reference in its entirety. Commonly assigned patent application U.S. Ser. No. 12/755,958, filed Apr. 7, 2010, published as U.S. Patent Application Publication 2011/0085049A1, and entitled "Method and Apparatus for Image Stabilization" is also hereby incorporated by reference in its entirety.

FIELD OF THE INVENTION

This patent application relates in general to digital image stabilization of video data, and more specifically to digital stabilization of video data from cameras producing multiple substantially simultaneous proximate views from a given direction, typically from rolling shutter type sensors, and without requiring a motion sensor.

BACKGROUND OF THE INVENTION

User operation of video imaging devices, in particular hand-held recording devices, can produce displaced or distorted image data due to small movements of the operator while supporting the imaging device. Displaced and distorted image data, however, is not desired. Accordingly, conventional methods and devices have been employed for stabilization of image data captured by video imaging devices.

For example, one conventional method includes employing one or more motion sensors, such as a gyroscope, to detect motion of the imaging device for correction of image data. These methods require motion sensors, which may increase cost, and may still result in image distortions as the motion sensing arrangements typically employed usually do not detect rotational motion around the optical axis nor translational camera motion. Difficulties with image stabilization may additionally increase when using zoom features of the imaging device, or when imaging scenes with a strongly three-dimensional (3D) nature, i.e. with both nearby and distant objects in view.

Optical stabilization systems may also shift the optics or the image sensor to correct for image shake. The main disadvantages of such systems are their complexity and cost. The available correction range is also limited due to a limited ability to shift the optics and/or image sensor. Further, rotational motion cannot usually be compensated with such systems.

A processor typically operates on image data, as it arrives or after storage in a memory, to digitally manipulate the pixels to correct for motion instabilities of various origins. Pixels are generally shifted in position by an amount calculated from various types of information provided by the camera or extracted from the video data. Processed images may be shifted, combined, warped, or otherwise used to compensate for problems with video quality according to image conditions, a given methodology, and/or user preferences.

Image data captured by rolling shutter type sensors can present unique difficulties. The term "rolling shutter" refers generally to a method of image acquisition in which each frame is recorded not from a snapshot of a single point in time, but rather by scanning across the frame, either vertically or horizontally. Not all parts of the image are recorded at exactly the same time, even though the whole frame is displayed at the same time during playback. Most CMOS sensors employed in the field are rolling shutter type sensors. The advantage of rolling shutters is that the image sensor can continue to gather photons during the acquisition process, thus increasing sensitivity. The disadvantage is that distortions and artifacts can occur, particularly when imaging fast-moving objects or scenes having rapid changes in light level.

When multiple views are available for the video sequence, for example when imagery is recorded by several sensors as in 3D video capture, the process of Digital Video Stabilization (DVS) may be improved. In the prior art, the multi-view video sequence is used to obtain structure-from-motion (i.e., a 3D description of the scene), to estimate 3D camera movement and then to form a single-view output video sequence with a smoothed 3D path. Performing the processes of structure-from-motion and determination of 3D camera movement is computationally very costly for real-time systems, however.

Further, the prior art does not address the problems intrinsic to the process of determination of camera motion, especially for cameras with rolling shutter sensors. These problems include distinguishing local motion from global motion (i.e. objects moving within a visual frame vs. the motion of the entire frame), and distinguishing 3D motion from CMOS/rolling shutter artifacts.

Thus, there is a need in the art for improvements in DVS by better using information obtainable from multiple views. This application describes a solution to these difficulties.

SUMMARY OF THE EMBODIMENTS

Systems, methods, and computer program products for digital video stabilization for multi-view imaging systems are disclosed and claimed herein.

As described more fully below, the apparatus and processes of the embodiments disclosed permit improved DVS for multi-view imaging systems. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

Describing the present invention in terms of an exemplary method embodiment, the processor-implemented method comprises acquiring substantially simultaneous views of a scene from multiple proximate viewpoints, estimating global transformation parameters by comparing a sequence of frames from the view from a selected reference viewpoint, estimating unintentional motion parameters from the selected reference viewpoint, compensating at least some of the views for global deformation and unintentional motion using the corresponding parameters from the selected reference viewpoint estimations, and outputting the stabilized views. The views may be acquired by a camera employing at least one rolling shutter type sensor, and/or that lacks a motion sensor, and/or is hand-held. The views may be captured with a multi-lens camera. The processor preferably operates in substantially real-time. Alternately, any motion may be estimated and compensated.

In other exemplary embodiments, the processor-implemented method comprises acquiring substantially simultaneous views of a scene from multiple proximate viewpoints, estimating a depth map from multiple views, estimating global transformation parameters by comparing a sequence of frames from the multiple views, estimating unintentional motion parameters, compensating at least some of the views for global deformation and unintentional motion using the corresponding parameter estimations, and outputting the stabilized views. Alternately, any motion may be estimated and compensated.

Estimating the depth map selectively includes interpolation between depth layers based on the number of feature points available at particular depth layers. Further, the compensating may be performed separately for each of multiple depth layers. In these embodiments, estimating global transformation parameters further comprises selecting a distance at which a maximal number of scene points is located and considering only motion vectors from image areas corresponding to the distance. Estimating global transformation parameters may further comprise averaging frames from several views, and/or selectively reducing stabilization if at least one of these conditions is true: (a) sufficient informative scene points are lacking at a distance at which a maximal number of scene points is located, and (b) the variance of object distances in the scene is high.

The method may further comprise identifying intentional motion in at least some views. The method may further comprise selectively compensating at least some of the views for local object distortion.

In a system embodiment, a processor executes instructions stored in a memory to acquire substantially simultaneous views of a scene from multiple proximate viewpoints, estimate global transformation parameters by comparing a sequence of frames from the view from a selected reference viewpoint, estimate unintentional motion parameters from the selected reference viewpoint, compensate at least some of the views for global deformation and unintentional motion using the corresponding parameters from the selected reference viewpoint estimations, and output the stabilized views.

Other system embodiments may comprise a processor and a memory that stores instructions, the processor instruction execution causing the system to acquire substantially simultaneous views of a scene from multiple proximate viewpoints, estimate a depth map from multiple views, estimate global transformation parameters by comparing a sequence of frames from the multiple views, estimate unintentional motion parameters, compensate at least some of the views for global deformation and unintentional motion using the corresponding parameter estimations, and output the stabilized views.

In a computer program product embodiment, a machine-readable medium tangibly embodies non-transitory program instructions thereon that, when executed by the machine, cause the machine to acquire substantially simultaneous views of a scene from multiple proximate viewpoints, estimate global transformation parameters by comparing a sequence of frames from the view from a selected reference viewpoint, estimate unintentional motion parameters from the selected reference viewpoint, compensate at least some of the views for global deformation and unintentional motion using the corresponding parameters from the selected reference viewpoint estimations, and output the stabilized views.

In other computer program product embodiments, the machine-readable medium tangibly embodies non-transitory program instructions thereon that, when executed by the machine, cause the machine to acquire substantially simultaneous views of a scene from multiple proximate viewpoints, estimate a depth map from multiple views, estimate global transformation parameters by comparing a sequence of frames from the multiple views, estimate unintentional motion parameters, compensate at least some of the views for global deformation and unintentional motion using the corresponding parameter estimations, and output the stabilized views.

DETAILED DESCRIPTION OF EXEMPLARY EMBODIMENTS

Embodiments of the present invention provide a new and patentably distinct methodology to perform DVS for multi-view imaging systems. Embodiments of the present invention enable DVS on 3D video, as well as improved 2D (two-dimensional) DVS, by using multiple simultaneously-recorded views for the process. The views input to the embodiments may be from stabilized cameras, but more generally any cameras may be used. The input views are of substantially the same scene, but typically captured from slightly different positions. The video camera is generally capable of capturing image data for one or more frames, and may be linked to a processor and a memory for processing image data and outputting the transformed stabilized results to an interface.

Briefly, a global transformation includes intentional motion (e.g. panning) and unintentional motion (e.g. undesired translational motion due to hand shake). A global deformation refers to non-translational global deformations (e.g. CMOS rolling shutter artifacts). The embodiments generally determine the global transformation, from which the global deformation and unintentional motion are extracted and then compensated out.

Figure 1:
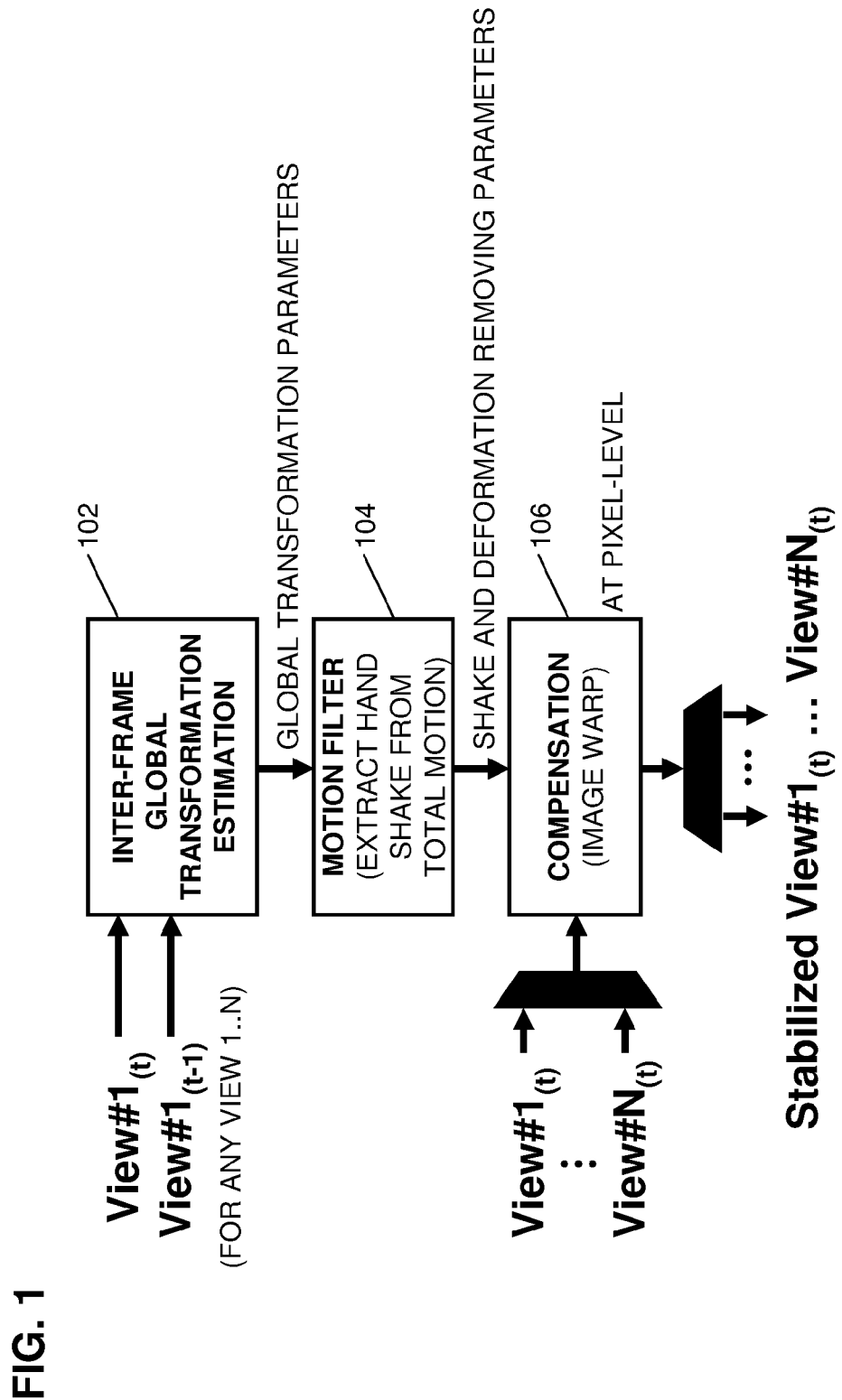
FIG. 1 depicts a flowchart according to a first embodiment.

Referring now to FIG. 1, a flow diagram is shown according to a first embodiment. In this embodiment, because all views were captured at the same time, the same motion compensation parameters calculated on the first view, possibly with a correction considering relative location of sensors, may be used for all the other views. This may be accomplished by performing a regular 2D stabilization on the first selected view and then extending the stabilization outputs onto the others. In other words, the embodiment may perform an estimation of the global 2D transformation on a single view and use this same global transformation, up to a correction to account for relative location of the sensors, to subsequently perform correction of all other views. This enables the very easy extension of current stabilization methods to multi-view video. For example, U.S. Patent Application Publication 2011/0085049A1 describes a 2D image stabilization methodology that may be employed by this embodiment, although the invention is not limited to this particular methodology. Extension of regular 2D stabilization to the case of 3D (or multi-view) video capture saves processing resources, so the embodiment may more easily be implemented on a real-time system versus a post-processing system.

First, in step 102, inter-frame global transformation is estimated from a time sequence of images taken by an imaging device from a particular viewpoint (e.g. from a particular lens on a multi-lens camera). Any viewpoint of those provided by the imaging device may be used as the reference viewpoint. This estimation yields a set of global transformation parameters that describe the global transformation of the scene as viewed from this reference viewpoint, from one frame to the next. (Note that although exemplary times t and t−1 are shown and described throughout this application, the scope of the invention encompasses the use of any different timepoints, e.g. t and t−i, where i is not necessarily one. That is, the embodiments may operate on sequential images, or also more broadly on a set of images selected from a sequence.) Next, in step 104, a motion filter extracts unintentional motion (e.g. from hand-shake of a hand-held camera) from total motion, and outputs a set of shake-removing deformation parameters. (Note, the compensation of different views may vary by taking into account the relative location of the sensor(s) that captured each view.) Finally, in step 106, images captured from the available viewpoints at a given timepoint may be processed to produce compensated (i.e. transformed) stabilized output images for all viewpoints, based on the parameters extracted from the originally selected reference viewpoint.

Although prior art DVS schemes may use information from multiple views, they are generally directed to stabilizing a single view video, not to producing stabilized 3D video.

Figure 2:
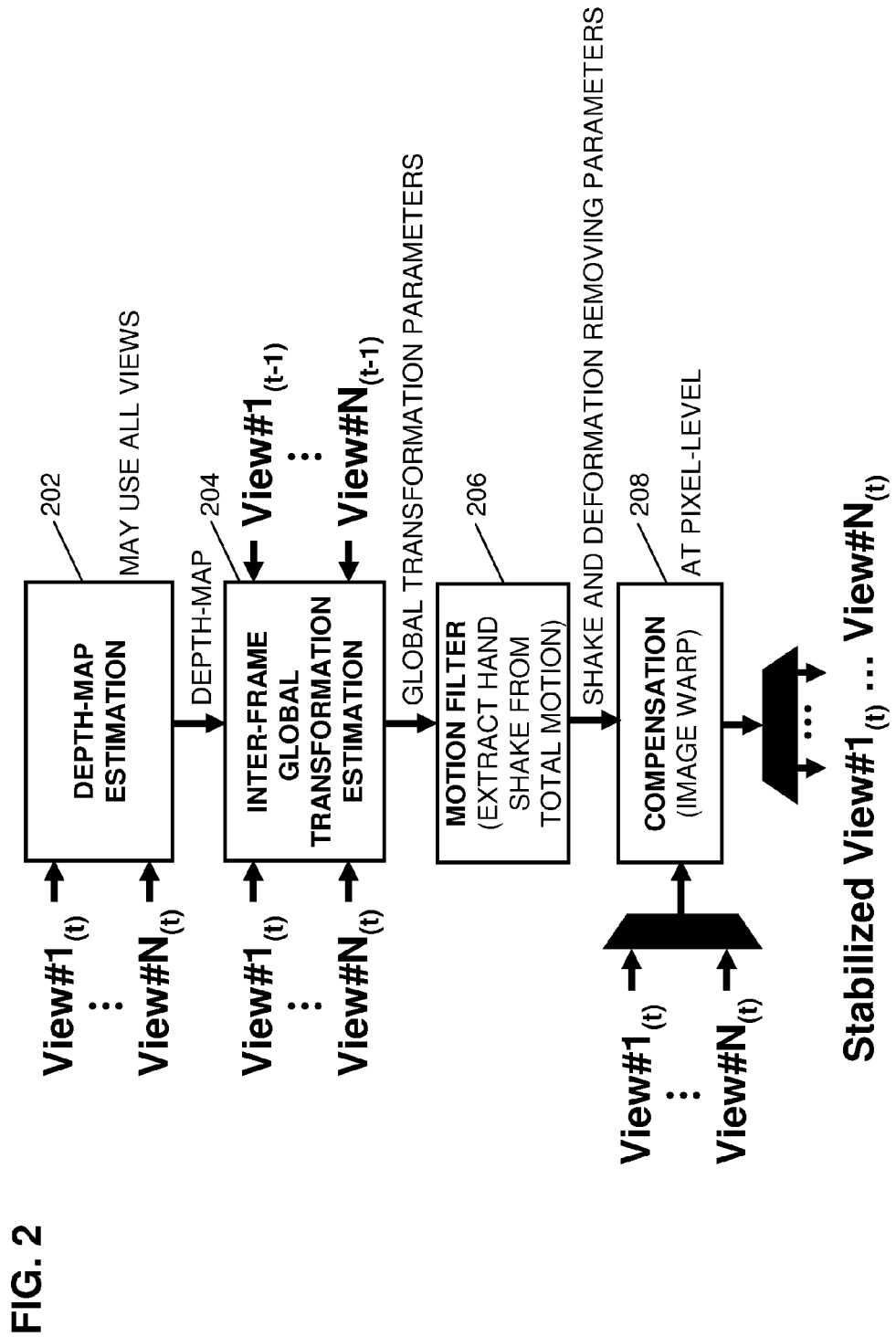
FIG. 2 depicts a flowchart according to a second embodiment.

Referring now to FIG. 2, a flow diagram is shown according to a second embodiment. This embodiment provides improved single-view 2D stabilization by using multiple views. The DVS process for one sensor is well studied and has been implemented in real-time systems. The main problems remaining in 2D DVS are in separating local motion from global motion, and in locking onto the background while the scene is strongly 3D in nature. This embodiment seeks to understand the depth of the scene, and to use the depth information to improve the ability to distinguish foreground and background objects. When multiple views are available, it is possible to improve the DVS in three major ways:

(1) Improve detection of the global transformation. This embodiment selects a distance at which a maximal number of scene points is located. The points located at this distance will be termed "background" and only the motion vectors from these image areas will be considered for determining the global transformation. Thus, in many cases, (a) the local motion can be separated from global motion and (b) the 3D scene changes can be separated from CMOS artifacts.

The problem of 3D motion is especially apparent for sensors with rolling shutters (i.e. typical CMOS sensors) where the 3D motion can be falsely identified as rolling shutter artifacts and, as a result, will be incorrectly stabilized. Incorrect stabilization may be quite distracting to a viewer. Local motion, such as two people in a scene moving apart, may resemble a zooming-out lens manipulation. If the local motion is rapid enough, it may cause rolling shutter artifacts that may skew the image in rather complex deformations. Thus, understanding the 3D nature of the scene is important for proper discrimination of local motion and shutter artifacts.

(2) Improve robustness of the detected global transformation. This embodiment improves global transformation robustness in two basic ways: (a) improving global transformation estimation by reducing the noise in the images by averaging images from several views, and (b) reducing stabilization when there are not enough informative background points or when the variance of distances of objects in the scene is high (i.e., a scene has a strongly 3D nature as described above).

In images of a long corridor, there are portions of the images from essentially all depths, so it is difficult to define a "background" depth. In images of an exterior perspective view with extensive camera shake, there isn't a readily identifiable steady point useful for background separation. In such cases, the embodiment reduces the level of DVS applied because reliable data needed to properly distinguish and eliminate distortion and artifacts is lacking. This approach can help prevent viewer distraction.

(3) Improve DVS correction. This embodiment identifies intentional motion in multiple views and combines this information to obtain a more robust estimation of intentional motion. Intentional motion may include panning and zooming of the camera, for example. If such motion is recognized in a number of views, there is increased confidence that the motion is intentional. In some situations, it is possible to provide correction for local moving objects. For example, when capturing video with a CMOS/rolling shutter type sensor, locally moving objects may appear distorted even when the camera is completely steady. By utilizing the 3D information for segmentation of the local object in a steady view, and then estimating its motion, it is possible to correct for distortion of the local object.

First, in step 202, the embodiment performs a depth map estimation on multiple input views at a given timepoint. It is also possible to use views taken at a different timepoint. Next, in step 204, the embodiment performs inter-frame global transformation estimation using multiple input views at given timepoints. The result is a set of global transformation parameters. Then, in step 206, as in the first embodiment, a motion filter extracts unintentional (e.g. camera shake) motion from total motion, and outputs a set of shake-removing deformation parameters. Finally, in step 208, images captured from some or all available viewpoints at a given timepoint may be processed to produce stabilized output images for the some or all viewpoints.

This embodiment thus enables the digital video stabilizer to work in higher noise conditions, and enables the stabilizer to eliminate artifacts from a scene with a strongly 3D nature. In contrast, prior art systems merely merge the views of the same scene, or address the problem of finding the smoothest 3D path for a single view given the camera's movement. The embodiments of the present invention therefore define novel tools and improvements of existing tools for determination of camera movement based on multi-view video. The 3D structure of a scene is analyzed to determine the background motion and intentional motion, and to properly stabilize local moving objects when they can be distinguished from rolling shutter artifacts. Objects closer to the camera move more due to camera shake compared to objects which are farther from the camera. Distant objects thus require less stabilization than closer objects.

Figure 3:
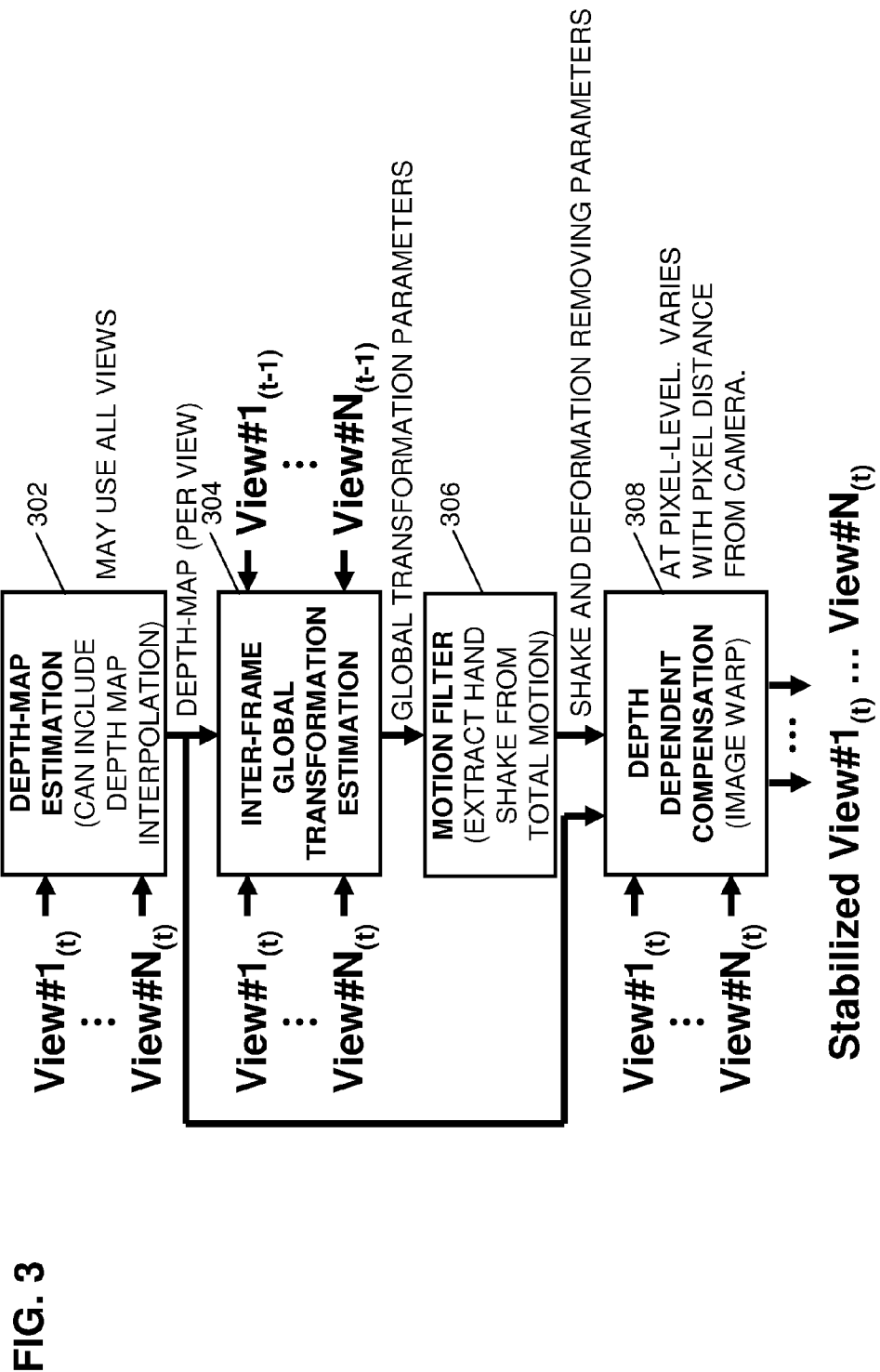
FIG. 3 depicts a flowchart according to a third embodiment.

Referring now to FIG. 3, a flowchart of the operation of a third embodiment is shown. The embodiment operates on each of several depth layers that may be assigned to a scene. This stabilizer uses a reference view and at least a second view in order to estimate depth of scene information, and based on this information or depth map, performs depth-specific 3D video stabilization. In other words, different stabilizations are conducted on pixels corresponding to points at different distances from the camera. Each separate stabilization may for example comprise the stabilization methodology described with regard to the second embodiment. Each stabilization may be performed in parallel.

The stabilizer has been found to work even with strongly 3D scenes, i.e. scenes including feature points with significant distance variations, if there are enough feature points per depth layer, even across all available images. An additional option is to interpolate the depth map in order to provide information to layers having only a small number of feature points. Thus, the embodiment may effectively perform stabilization for each of many depth layers, even if there are not enough points at a given depth for direct analysis.

First, in step 302, the embodiment performs a depth map estimation on multiple input views at a given timepoint. It is also possible to use views taken at a different timepoint. The depth map estimation may include interpolation if necessary based on the number of feature points available at a given depth layer. The depth map, per view, is output for use in subsequent steps. Next, in step 304, the embodiment performs inter-frame global transformation estimation using multiple input views at given timepoints. The result is a set of global transformation parameters. Then, in step 306, as in the first and second embodiments, a motion filter extracts unintentional motion (e.g. camera shake) from total motion, and outputs a set of shake-removing deformation parameters. Finally, in step 308, images captured from some or all available viewpoints at a given timepoint may be processed to produce stabilized output images for the available viewpoints. Unlike the second embodiment, though, the motion compensation is different for the various depth layers as it depends on the distance of the point from the camera and the particular view being processed, based upon the per-view depth maps previously ascertained.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A processor-implemented method for digital video stabilization, comprising:
   acquiring substantially simultaneous views of a scene from multiple proximate viewpoints;
   estimating a depth map from the views of the multiple proximate viewpoints, wherein the depth map includes a plurality of three dimensional (3D) layers;
   estimating global transformation parameters by comparing a set of frames from the views;
   estimating unintentional motion parameters;
   compensating at least some of the views for global deformation and unintentional motion using the corresponding parameter estimations, wherein the compensation for each view is performed separately for each 3D layer of the depth map; and
   outputting the stabilized views.

2. The method of claim 1 wherein the views are acquired by a camera employing at least one rolling shutter type sensor.

3. The method of claim 1 wherein the views are acquired by a camera without a motion sensor.

4. The method of claim 1 wherein the views are acquired by a hand-held camera.

5. The method of claim 1 wherein the views are acquired with a multi-lens camera.

6. The method of claim 1 wherein the processor operates in substantially real-time.

7. The method of claim 1 wherein estimating global transformation parameters further comprises:
   selecting a distance at which a maximal number of scene points is located; and
   considering only motion vectors from image areas corresponding to the distance.

8. The method of claim 1 wherein estimating global transformation parameters further comprises averaging frames from several views.

9. The method of claim 1 wherein estimating global transformation parameters further comprises selectively reducing stabilization if at least one of these conditions is true: (a) sufficient informative scene points are lacking at a distance at which a maximal number of scene points is located, and (b) a variance of object distances in the scene is high.

10. The method of claim 1 further comprising identifying intentional motion in at least some views.

11. The method of claim 1 further comprising selectively compensating at least some of the views for local object distortion.

12. The method of claim 1 wherein estimating the depth map selectively includes interpolation between depth layers based on a number of feature points available at particular depth layers.

13. The method of claim 1 further comprising executing the compensating separately for each 3D layer of the depth map.

14. A computer program product comprising a non-transitory machine-readable medium comprising instructions thereon that, when executed by the machine, cause the machine to:
acquire substantially simultaneous views of a scene from multiple proximate viewpoints;
estimate a depth map from the views of the multiple proximate viewpoints, wherein the depth map includes a plurality of three dimensional (3D) layers;
estimate global transformation parameters by comparing a set of frames from the views;
estimate unintentional motion parameters;
compensate at least some of the views for global deformation and unintentional motion using the corresponding parameter estimations, wherein the compensation for each view is performed separately for each 3D layer of the depth map; and
output the stabilized views.

15. A system for digital video stabilization, comprising:
means for acquiring substantially simultaneous views of a scene from multiple proximate viewpoints;
means for estimating a depth map from the views of the multiple proximate viewpoints, wherein the depth map includes a plurality of three dimensional (3D) layers;
means for estimating global transformation parameters by comparing a set of frames from the views;
means for estimating unintentional motion parameters;
means for compensating at least some of the views for global deformation and unintentional motion using the corresponding parameter estimations, wherein the compensation for each view is performed separately for each 3D layer of the depth map; and
means for outputting the stabilized views.

16. A system for digital video stabilization, comprising:
a processor; and
a memory that stores instructions that, when executed by the processor cause the processor to:
acquire substantially simultaneous views of a scene from multiple proximate viewpoints;
estimate a depth map from the views of the multiple proximate viewpoints, wherein the depth map includes a plurality of three dimensional (3D) layers;
estimate global transformation parameters by comparing a set of frames from the views;
estimate unintentional motion parameters;
compensate at least some of the views for global deformation and unintentional motion using the corresponding parameter estimations, wherein the compensation for each view is performed separately for each 3D layer of the depth map; and
output the stabilized views.

17. A processor-implemented method for digital video stabilization, comprising:
acquiring substantially simultaneous views of a scene from multiple proximate viewpoints;
estimating a depth map from the views of the multiple proximate viewpoints, wherein the depth map includes a plurality of three dimensional (3D) layers;
estimating global transformation parameters by comparing a set of frames from the views;
estimating motion parameters;
compensating at least some of the views for global deformation and motion using the corresponding parameter estimations, wherein the compensation for each view is performed separately for each 3D layer of the depth map; and
outputting the stabilized views.

18. A computer program product comprising a non-transitory machine-readable medium comprising instructions thereon that, when executed by the machine, cause the machine to:
acquire substantially simultaneous views of a scene from multiple proximate viewpoints;
estimate a depth map from the views of the multiple proximate viewpoints, wherein the depth map includes a plurality of three dimensional (3D) layers;
estimate global transformation parameters by comparing a set of frames from the views;
estimate motion parameters;
compensate at least some of the views for global deformation and motion using the corresponding parameter estimations, wherein the compensation for each view is performed separately for each 3D layer of the depth map; and
output the stabilized views.

19. A system for digital video stabilization, comprising:
means for acquiring substantially simultaneous views of a scene from multiple proximate viewpoints;
means for estimating a depth map from the views of the multiple proximate viewpoints, wherein the depth map includes a plurality of three dimensional (3D) layers;
means for estimating global transformation parameters by comparing a set of frames from the views;
means for estimating motion parameters;
means for compensating at least some of the views for global deformation and motion using the corresponding parameter estimations, wherein the compensation for each view is performed separately for each 3D layer of the depth map; and
means for outputting the stabilized views.

20. A system for digital video stabilization, comprising:
a processor; and
a memory that stores instructions that, when executed by the processor cause the processor to:
acquire substantially simultaneous views of a scene from multiple proximate viewpoints;
estimate a depth map from the views of the multiple proximate viewpoints, wherein the depth map includes a plurality of three dimensional (3D) layers;
estimate global transformation parameters by comparing a set of frames from the views;
estimate motion parameters;
compensate at least some of the views for global deformation and motion using the corresponding parameter estimations, wherein the compensation for each view is performed separately for each 3D layer of the depth map; and
output the stabilized views.

* * * * *